US012393133B2

(12) United States Patent
Luke et al.

(10) Patent No.: US 12,393,133 B2
(45) Date of Patent: Aug. 19, 2025

(54) CARTRIDGE WITH SELECTIVELY DISRUPTABLE TONER TRANSFER FOR IMAGE FORMING DEVICE

(71) Applicant: Hewlett-Packard Development Company, L.P., Spring, TX (US)

(72) Inventors: Jeffrey Harold Luke, Boise, ID (US); Justin D. Pettingill, Boise, ID (US); Gabriel Scott McDaniel, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/572,117

(22) PCT Filed: Jul. 9, 2021

(86) PCT No.: PCT/US2021/041020
§ 371 (c)(1),
(2) Date: Dec. 19, 2023

(87) PCT Pub. No.: WO2023/282910
PCT Pub. Date: Jan. 12, 2023

(65) Prior Publication Data
US 2024/0288798 A1 Aug. 29, 2024

(51) Int. Cl.
*G03G 15/01* (2006.01)
*G03G 21/18* (2006.01)

(52) U.S. Cl.
CPC ..... *G03G 15/0136* (2013.01); *G03G 21/1821* (2013.01); *G03G 21/1825* (2013.01); *G03G 21/1817* (2013.01)

(58) Field of Classification Search
None
See application file for complete search history.

(56) References Cited

U.S. PATENT DOCUMENTS

| | | | |
|---|---|---|---|
| 6,349,186 | B1 | 2/2002 | Park et al. |
| 8,670,690 | B2 | 3/2014 | Jang et al. |
| 9,804,560 | B2 | 10/2017 | Sato et al. |
| 10,095,158 | B1 | 10/2018 | Yamamoto et al. |
| 10,228,652 | B2 | 3/2019 | Sato et al. |
| 10,564,568 | B2 | 2/2020 | Jung et al. |
| 10,678,185 | B2 | 6/2020 | Uneme et al. |

(Continued)

FOREIGN PATENT DOCUMENTS

| | | | |
|---|---|---|---|
| EP | 3324243 | A1 | 5/2018 |
| JP | 2001-337511 | A | 12/2001 |
| KR | 10-2018-0008220 | A | 1/2018 |

*Primary Examiner* — Arlene Heredia
(74) *Attorney, Agent, or Firm* — Foley & Lardner LLP

(57) ABSTRACT

An apparatus includes a developer and a photoreceptor, where the developer is to transfer a toner to the photoreceptor. The apparatus includes a housing that is moveable in an image forming device, and an actuator assembly engaged with the housing. The actuator assembly is actuatable between different states in response to control by the image forming device during an image forming operation of the image forming device, where a first state of the different states corresponds to the housing being at a first position that disrupts a transfer of the toner to a transfer member of the image forming device during the image forming operation, and a second state of the different states corresponds to the housing being at a second position that allows the transfer of the toner to the transfer member.

16 Claims, 6 Drawing Sheets

(56) References Cited

U.S. PATENT DOCUMENTS

| | | | |
|---|---|---|---|
| 10,712,708 | B2 | 7/2020 | Sato et al. |
| 2005/0053394 | A1 | 3/2005 | Ishii et al. |
| 2005/0069342 | A1 | 3/2005 | Kanno et al. |
| 2009/0058978 | A1 | 3/2009 | Itabashi |
| 2018/0307179 | A1 | 10/2018 | Lee et al. |
| 2019/0094792 | A1 | 3/2019 | Kurihara et al. |
| 2019/0137904 | A1 | 5/2019 | Jung et al. |
| 2019/0302685 | A1 | 10/2019 | Abe |

CARTRIDGE WITH SELECTIVELY DISRUPTABLE TONER TRANSFER FOR IMAGE FORMING DEVICE

CROSS-REFERENCE TO RELATED APPLICATIONS

This application is a U.S. National Stage Patent Application under 35 U.S.C. § 371 of PCT/US2021/041020, filed Jul. 9, 2021, which is hereby incorporated by reference in its entirety.

BACKGROUND

A printing device can deliver a print material to a print medium to form an image on the print medium. In some examples, a printing device can be an electrophotographic printing device that supplies a toner (which is a type of print material) to an electrostatic latent image formed on a photoreceptor to form a visible toner image on the photoreceptor. The electrophotographic printing device transfers the toner image to a print medium, and then fixes the transferred toner image to the print medium, to form an image on the print medium.

BRIEF DESCRIPTION OF THE DRAWINGS

Some implementations of the present disclosure are described with respect to the following figures.

Figure 1B:
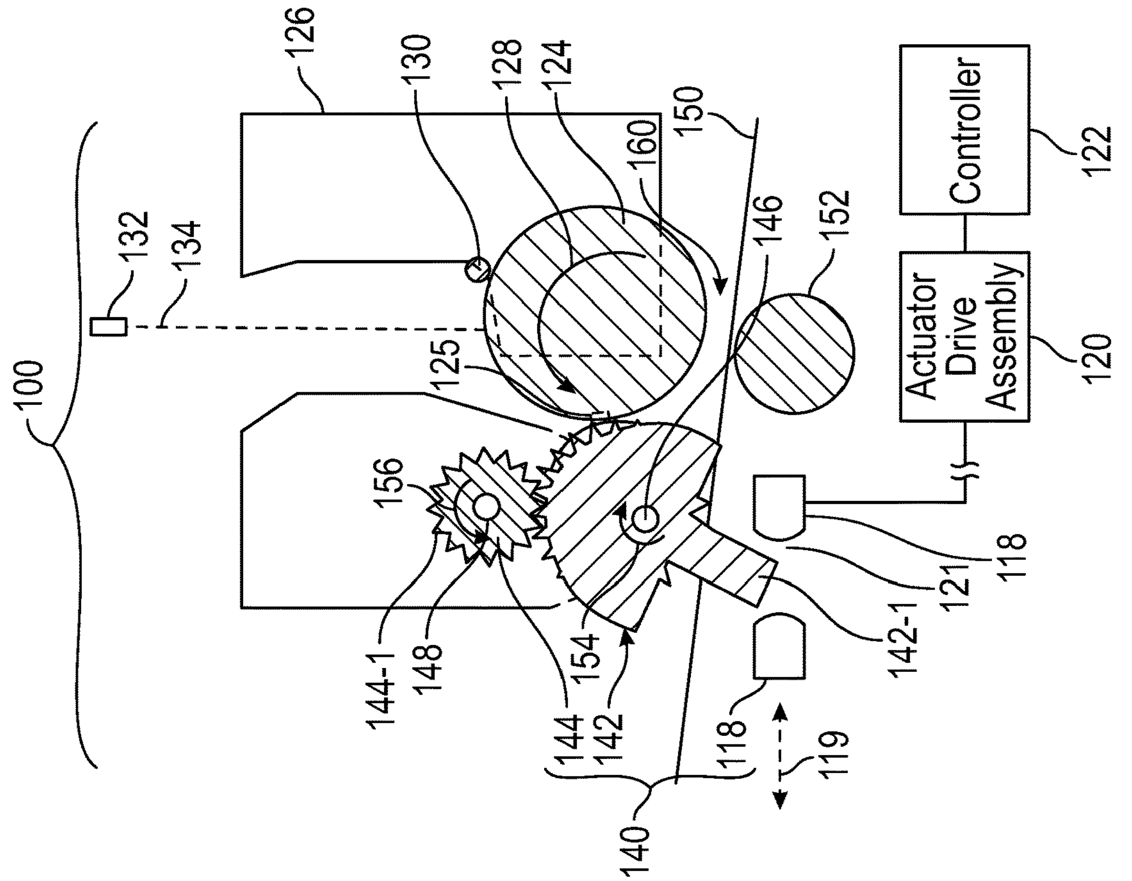
FIGS. 1A-1B, 2A-2B, and 3A-3B are schematic diagrams of a portions of image forming devices according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An image forming device such as an electrophotographic printing device can employ a photoreceptor on which an electrostatic latent image is formed, for use in transferring an image to a target medium (e.g., a print medium such as a paper substrate or a substrate of another material). The photoreceptor can be in the form of a photosensitive drum that includes a cylindrical tubular structure and a photosensitive layer on the cylindrical tubular structure.

A charging element can be used to charge a surface of the photosensitive drum to a uniform electrical potential (e.g., a negative electrical potential). In some examples, the charging element can include a charging roller. In other examples, a charging element can be in the form of a corona charger that can charge the surface of the photosensitive drum to a uniform electrical potential without making physical contact with the surface of the photosensitive drum.

A light source (e.g., a laser source, light emitting diode(s) (LEDs), etc.) can be activated by a controller of the image forming device to irradiate selected portions of the charged surface of the photosensitive drum, to form an electrostatic latent image on the photosensitive drum.

A developing device in the image forming device includes a developer (e.g., a developing roller) onto which a developing agent including an electrically charged toner is adhered. During operation of the image forming device, as the developing roller rotates relative to the photosensitive drum (which also rotates in the opposite rotational direction of the developing roller), the developing agent on the developing roller is conveyed to a supply region facing the photosensitive drum. In this supply region, a layer of toner adhered to the surface of the developing roller can be transferred to the photosensitive layer of the photosensitive drum on which the electrostatic latent image has been formed, which develops the electrostatic latent image on the surface of the photosensitive drum to form a visible toner image on the photosensitive drum.

In some examples, the developing device including the developing roller can be part of a cartridge that is removably inserted into the image forming device. The cartridge can include a reservoir containing a toner, and the toner in the reservoir can be transferred to the developing roller.

When the cartridge is inserted into an image forming device, the developing roller is energized by applying a bias voltage to the outer surface of the developing roller. The electrically charged toner in the reservoir of the cartridge is electrically attracted by the bias voltage to the outer surface of the developing roller.

In some cases, the developing roller is continually energized (the bias voltage is continually applied to the developing roller) so long as the cartridge remains inserted in the image forming device and the image forming device is in an active state (e.g., the image forming device is not powered off or in a sleep mode). When the developing roller is energized, rotation of the developing roller continues to attract toner to the developing roller, and in conjunction with a rotation of the photosensitive drum, the toner is transferred to the photosensitive drum.

In some examples, an ability to selectively control whether or not toner can be transferred from the developing roller to the photosensitive drum during an active operation of an image forming device is not available. As a result, a user of the image forming device is not provided with the flexibility to selectively disrupt the transfer of toner from the developing roller to the photosensitive drum while the image forming device is active, such as during an image forming operation (e.g., performed as part of a maintenance of the image forming device, or a test of the image forming device, or during normal use by a customer of the image forming device). The ability to selectively disrupt a transfer of the toner from the developing roller to the photosensitive drum can be useful for various purposes, such as to test the cartridge or the image forming device, to perform maintenance of the cartridge or the image forming device, to check a status of the cartridge or the image forming device, and so forth.

The disruption of the transfer of a toner to the photoreceptor or the transfer member can include: 1) modifying a transfer the toner from the developer to the photoreceptor (by disabling the transfer of the toner from the developer to the photoreceptor, or by changing the amount of the toner transferred from the developer to the photoreceptor that deviates from an expected amount based on image data representing an image to be formed on a target medium), or 2) modifying a transfer of the toner from the photoreceptor to a transfer member.

In accordance with some implementations of the present disclosure, techniques or mechanisms are provided to selectively disrupt a transfer of toner from a developer (e.g., a developing roller) to a photoreceptor (e.g., a photosensitive drum) during an image forming operation of an image forming device (e.g., during a print operation), or to disrupt the toner a transfer of toner from the photoreceptor to a transfer member (e.g., an intermediate transfer member) during the image forming operation. In some examples, the selective disruption uses an actuator assembly of a cartridge that includes the developer and the photoreceptor. The actuator assembly is to cause movement (e.g., rotation, translation, a combination of different movements, etc.) of a housing of the cartridge during the image forming operation.

The housing of the cartridge being at a first position (e.g., a first pivotal position, a first translation position, etc.) disrupts a transfer of a toner to a photoreceptor or a transfer member (e.g., an intermediate transfer member such as an intermediate transfer belt, a target member such as a print medium, etc.) of the image forming device during the image forming operation. The housing being at a second position (e.g., a second pivotal position, a second translation position, etc.) allows the transfer of the toner to the photoreceptor or the transfer member of the image forming device during the image forming operation.

In the ensuing discussion, reference is made to examples in which a developer is in the form of a developing roller, and a photoreceptor is in the form of a photosensitive drum. In other examples, other types of developers and/or photoreceptors can be employed.

Figure 1A:
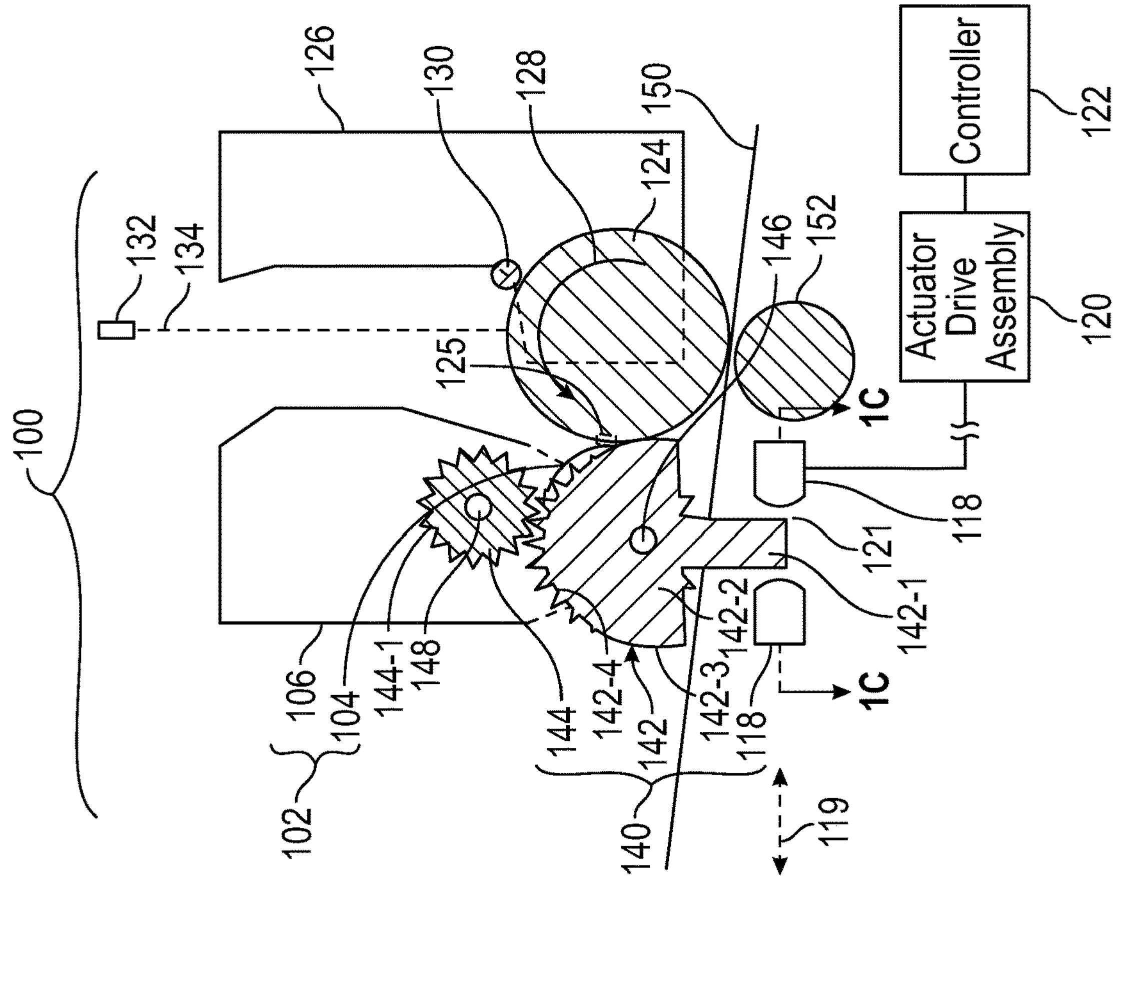

FIGS. 1A-1B illustrate portions of an image forming device 100 that includes an actuator assembly at respective different states to move a housing to which a developing roller 104 and a photosensitive drum 124 are attached between different positions, as shown in FIGS. at 1A-1B. Note that some portions of the image forming device 100 are not shown in the FIGS. 1A-1B for brevity.

Also, although a specific example actuator assembly is depicted in FIGS. 1A-1B, it is noted that in other examples, actuator assemblies for moving a housing can have different arrangements.

The housing to which the developing roller 104 and the photosensitive drum 124 are attached can be the housing of a cartridge. As used here, a "housing" can refer to a single housing segment or multiple housing segments that are attached together.

The cartridge is removably insertable into the image forming device 100 in some examples. The cartridge contains a toner that is to be transferred to the developing roller 104, which in turn transfers the toner to the photosensitive drum 124. A user may remove an existing cartridge and insert a new cartridge into the image forming device 100, such as when the toner of the existing cartridge is depleted.

In some examples, the housing of the cartridge can include a housing segment 126 that rotatably supports the photosensitive drum 124. The cartridge housing can also include a wall of the reservoir 106. The cartridge housing can include further housing segments that are not shown in FIGS. 1A-1B.

The developing roller 104 is part of a developing device 102 (which is part of the cartridge) that further includes a reservoir 106 as well as other components (not shown). The reservoir 106 contains a developing agent that includes an electrically charged toner. For example, the developing agent can include the electrically charged toner, a mixture of the electrically charged toner and a liquid carrier, or the toner with carrier particles.

During an image forming operation of the image forming device 100, a bias voltage can be applied to the developing roller 104. The bias voltage is supplied from a voltage source (not shown) of the image forming device 100.

In some examples, a regulator (not shown) of the developing device 102 regulates a thickness of a toner that is adhered to the outer surface of the developing roller 104. The regulator can be in the form of a regulating blade or another type of regulator. A tip of the regulating blade can come into contact or close proximity with the outer surface of the developing roller 104. As the developing roller 104 rotates in a first rotational direction 112, the electrically charged toner is transferred from the reservoir 106 to the outer surface of the developing roller 104 (the electrically charged toner is attracted to the outer surface of the developing roller 104 by the bias voltage applied to the developing roller 104). The regulator sets the thickness of the toner on the developing roller 104 to be uniform as the developing roller 104 rotates. In some examples, the regulator can also be set to the bias voltage from the voltage source.

The cartridge further includes an actuator assembly 140 that includes an actuator 118, a pivot transfer member 142 that is pivotally attached at a pivot point 146 to the cartridge housing, and a gear 144.

Figure 1C:
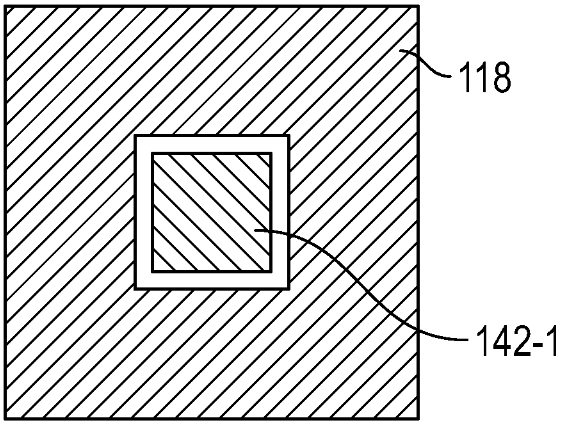
FIG. 1C is a cross-sectional view of an actuator of an actuator assembly, according to some examples.

The pivot transfer member 142 has a lever (in the form of a stem 142-1) that is received in a receptacle 121 of the actuator 118. Movement of the actuator 118 along an axis 119 causes a pivoting motion of the pivot transfer member 142 about the pivot point 146. The actuator 118 engages the stem 142-1 to cause a rotation of the pivot transfer member 142. FIG. 1C shows a cross-sectional view of the actuator 118 taken along section 1C-1C in FIG. 1A. The actuator 118 is generally ring-shaped (a square ring in the example shown in FIG. 1C, although other shapes can be used in other examples). The opening in the center corresponds to the receptacle 121 of FIGS. 1A-1B. In other examples, the actuator 118 does not surround all sides of the stem 142-1 of the pivot transfer member 142.

The pivot transfer member 142 further includes an enlarged segment 142-2 that has a general profile of half a disk. The enlarged segment 142-2 is attached to the stem 142-1, and has a generally curved outer surface 142-3 on which a teeth profile 142-4 is formed. The rotation of the pivot transfer member 142 due to movement of the actuator 118 causes a corresponding rotation of the teeth profile 142-4.

The teeth profile 142-4 of the enlarged segment 142-2 engages with a teeth profile 144-1 of the gear 144.

The gear 144 of the actuation assembly 140 is fixed to the cartridge housing, which in the example of FIGS. 1A-1B is the wall of the reservoir 106. The gear 144 that is fixedly attached to the cartridge housing can be rotated about a pivot point 148. Rotation of the gear 144 (in response to engagement of the teeth profiles 142-4 and 144-1 and the rotation of the pivot transfer member 142) would cause rotation of the cartridge housing about the pivot point 148.

The cartridge housing can be pivotally attached at the pivot point 148 with respect to a support (not shown) of the image forming device 100. For example, the support of the image forming device 100 can include a carriage or another type of support.

In examples according to FIGS. 1A-1B, an intermediate transfer member 150 (e.g., an intermediate transfer belt) can be passed between the photosensitive drum 124 and a transfer roller 152. The intermediate transfer member 150 and the transfer roller 152 are part of the image forming device 100. A small gap is provided between the photosensitive drum 124 and the transfer roller 152 through which the intermediate transfer member 150 can pass.

In examples with the intermediate transfer member 150, a toner image is transferred from the photosensitive drum 124 to the intermediate transfer member 150, which then transfers the toner image to a target medium, such as a print medium. In such examples, the toner image is indirectly transferred from the photosensitive drum 124 to the target medium through the intermediate transfer member 150.

In other examples, the toner image can be transferred directly from the photosensitive drum 124 to the target medium. In this case, the intermediate transfer member 150 can be replaced with the target medium.

More generally, reference is made to transferring the toner image from the photosensitive drum 124 to a transfer member, where the transfer member can be the intermediate transfer member 150 or a target medium such as a print medium.

The actuator 118 is moved by a drive assembly 120 of the image forming device 100. In some examples, the drive assembly 120 can include a motor, a solenoid mechanism, an assembly of gears, or any other type of assembly that can impart motion on the actuator 118. The drive assembly 120 can be controlled by a controller 122 of the image forming device 100. In some examples, the controller 122 can control image forming operations and/or other operations of the image forming device 100.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

In examples according to FIGS. 1A-1B, the actuator 118 slides left and right (in the view of FIGS. 1A-1B) along the axis 119 in response to being driven by the actuator drive assembly 120 under control of the controller 122. In other examples, the actuator 118 can be pivoted, rotated, or caused to have another type of motion based on being driven by the actuator drive assembly 120 under control of the controller 122.

The photosensitive drum 124 is located in close proximity with the developing roller 104 in a supply region 125 where the toner is to be transferred from the developing roller 104 to the photosensitive drum 124. In some examples, an outer surface of the developing roller 104 can make physical contact with the outer surface of the photosensitive drum 124. In other examples, the outer surface of the developing roller 104 is in sufficiently close proximity to the outer surface of the photosensitive drum 124 such the toner that is on the outer surface of the developing roller 104 can be transferred to the outer surface of the photosensitive drum 124 (or more specifically, to the outer surface of a photosensitive layer of the photosensitive drum 124). In some examples, the photosensitive drum 124 is rotatably supported by the housing segment 126.

During an image forming operation, the photosensitive drum 124 is rotated in a second rotational direction 128, which is opposite a first rotational direction 112 (depicted in FIGS. 2A-2B) of the developing roller 104. For example, the first rotational direction 112 is a clockwise direction, while the second rotational direction 128 is a counterclockwise direction (or vice versa). In other examples, the developing roller 104 and the photosensitive drum 124 can rotate in the same direction.

As further shown in FIG. 1A, an imaging charging element 130 when energized is used to charge the outer surface of the photosensitive drum 124 to a uniform electric potential. The imaging charging element 130 can include a charging roller or a corona charger, according to some examples.

The image forming device 100 further includes a light source 132 to irradiate selected portions of the electrically charged outer surface of the photosensitive drum 124 with light 134. The light 134 from the light source 132 is modulated according to image data received by the controller 122. The image data defines the image to be formed on a target medium 136, such as a print substrate. Note that the light source 132 is external of the cartridge and is part of the image forming device 100.

Each portion of the electrically charged outer surface of the photosensitive drum 124 irradiated with the light 134 will have the portion's electric potential changed (from the electric potential charged by the imaging charging element 130). In first examples, the selected portions irradiated with the light 134 correspond to respective portions of an image to be formed on the target medium 136.

In such first examples, toner is transferred from the developing roller 104 to the irradiated selected portions where the respective portions of the image are to be formed on the target medium. In the first examples, the toner is transferred to locations of the electrostatic latent image formed on the outer surface of the photosensitive drum 124.

In second examples, the selected portions irradiated with the light 134 correspond to respective portions where an image is not to be formed on the target medium 136. In such second examples, toner is transferred from the developing roller 104 to remaining portions of the outer surface of the photosensitive drum 124 where the light 134 has not irradiated. In the second examples, the toner is transferred to locations outside of the electrostatic latent image formed on the outer surface of the photosensitive drum 124.

The irradiation of the outer surface of the photosensitive drum 124 with the light 134 forms an electrostatic latent image on the outer surface of the photosensitive drum 124. Toner is transferred from the developing roller 104 to the outer surface of the photosensitive drum 124 based on the electrostatic latent image, to develop the electrostatic latent image to form a visible toner image on the outer surface of the photosensitive drum 124.

The toner image on the photosensitive drum 124 can then be transferred to the intermediate transfer member 150 (or more generally, a transfer member) that passes between the photosensitive drum 124 and the transfer roller 152.

FIG. 1B show the actuator 118 being moved to the left by the actuator drive assembly 120, under control of the controller 122. Moving the actuator 118 to the left engages the stem 142-1 of the pivot transfer member 142, which causes rotation of the pivot transfer member 142 in a rotational direction 154 about the pivot point 146. The rotation of the pivot transfer member 142 in the rotational direction 154 (e.g., clockwise direction in FIG. 1B) causes the gear 144 to pivot in a rotational direction 156 (e.g., counterclockwise direction) about the pivot point 148. The rotation of the gear 144 in the rotational direction 156 causes the cartridge housing that is fixedly attached to the gear 144 to also rotate in the rotational direction 156 relative to a support (not shown) of the image forming device 100, as shown in FIG. 1B.

The rotation of the cartridge housing in the rotational direction 156 causes lifting of the photosensitive drum 124 away from the upper surface of the intermediate transfer member 150. As a result of the lifting of the photosensitive drum 124 away from the intermediate transfer member 150 by the rotation of the cartridge housing in the rotational direction 156, a gap 160 is formed between the outer surface of the photosensitive drum 124 and the upper surface of the intermediate transfer member 150. This gap 160 prevents transfer of any toner image from the outer surface of the photosensitive drum 124 to the upper surface of the intermediate transfer member 150.

In a first state of the actuator assembly 140 shown in FIG. 1A, the cartridge housing is set at its first position so that the photosensitive drum 124 is engaged with the upper surface of the intermediate transfer member 150 to allow for normal transfer of a toner image from the photosensitive drum 124 to the upper surface of the intermediate transfer member 150. The "normal transfer" of the toner image can refer to a transfer of the toner image that is based on a target operation of the image forming device 100 for forming an image on a target medium according to image data received by the controller 122.

In a second state of the actuator assembly 140 shown in FIG. 1B, the cartridge housing is set at its second position so that the photosensitive drum 124 is moved away from the upper surface of the intermediate transfer member 150 to prevent the transfer of a toner image from the photosensitive drum 124 to the upper surface of the intermediate transfer member 150. This effectively prevents formation of the image on the target medium according to the image data received by the controller 122.

Figure 2B:
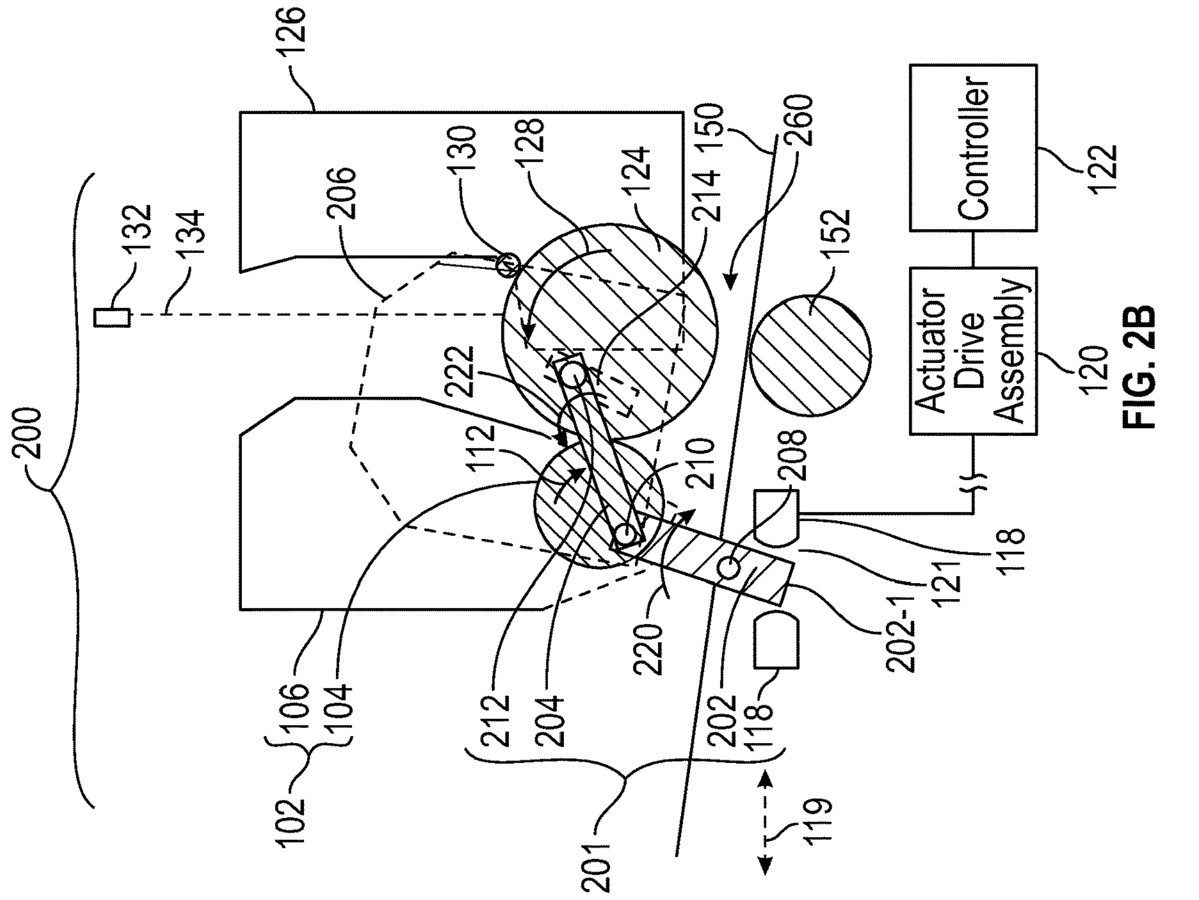
Figure 2A:
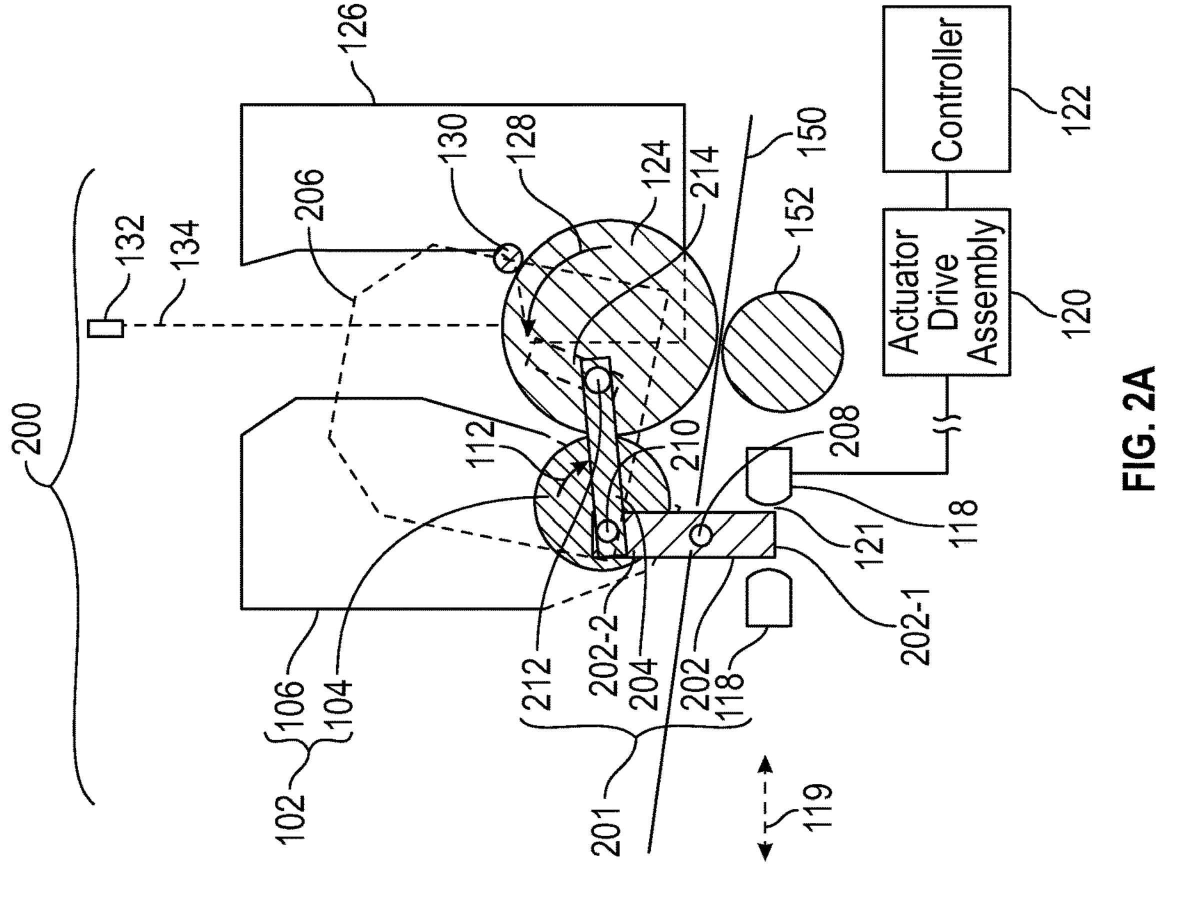

FIGS. 2A-2B depicts another arrangement in which a cartridge housing can be moved from a first position (FIG. 2A) to a second position (FIG. 2B) by an actuator assembly 201 that includes the actuator 118 and other components depicted in FIGS. 2A-2B.

Components of the image forming device 200 similar to those of the image forming device 100 of FIGS. 1A-1B share the same reference numerals.

As shown in FIG. 2A, the actuator assembly 201 includes the actuator 118, a lever 202, a link member 204, and a pin 212.

The image forming device 201 includes a motion transfer plate 206, which is shown as being transparent to allow components behind the motion transfer plate 206 to be visible in FIGS. 2A-2B. The motion transfer plate 206 can be part of the support for the cartridge of FIGS. 2A-2B. For example, the motion transfer plate 206 can be part of a carriage or other support of the image forming device 200.

The cartridge housing is moveable relative to the motion transfer plate 206 to allow for movement of the motion transfer plate 206 relative to the intermediate transfer member 150 (or more generally, a transfer member).

The lever 202 can be rotated about a pivot point 208 that is attached to the cartridge housing. A first end portion 202-1 of the lever 202 is received in the receptacle 121 of the actuator 118. A second end portion 202-2 of the lever 202 is pivotally attached to a first end portion of the link member 204 at a pivot point 210. A second end portion of the link member 204 is attached to the pin 212 that can slide along an elongated groove 214 of the motion transfer plate 206.

FIG. 2B shows the actuator 118 moving to the left along the axis 119, as driven by the actuator drive assembly 120 under control of the controller 122. The left movement of the actuator 118 engages the lower portion 202-1 of the lever 202, which causes the lever 202 to rotate about the pivot point 208 in a rotational direction 220 (e.g., a clockwise direction).

The rotation of the lever 202 in the rotational direction 220 causes the link member 204 to rotate in a rotational direction 222 (e.g., counterclockwise direction) at the pivot point 210. The rotation of the link member 204 in the rotational direction 222 causes the pin 212 attached to the second end portion of the link member 204 to slide generally upwardly along the elongated groove 214 of the motion transfer plate 206.

The motion transfer plate 206 can be fixed in position in the image forming device 200, and the cartridge housing is movable relative to the motion transfer plate 206. As a result, since the pin 212 is attached to the cartridge housing, the pin 212 sliding generally upwardly in the elongated groove 214 of the fixed motion transfer plate 206 causes the cartridge housing to rise, as shown in FIG. 2B, to create a gap 260 between the outer surface of the photosensitive drum 124 and the upper surface of the transfer member 150.

Figure 3B:
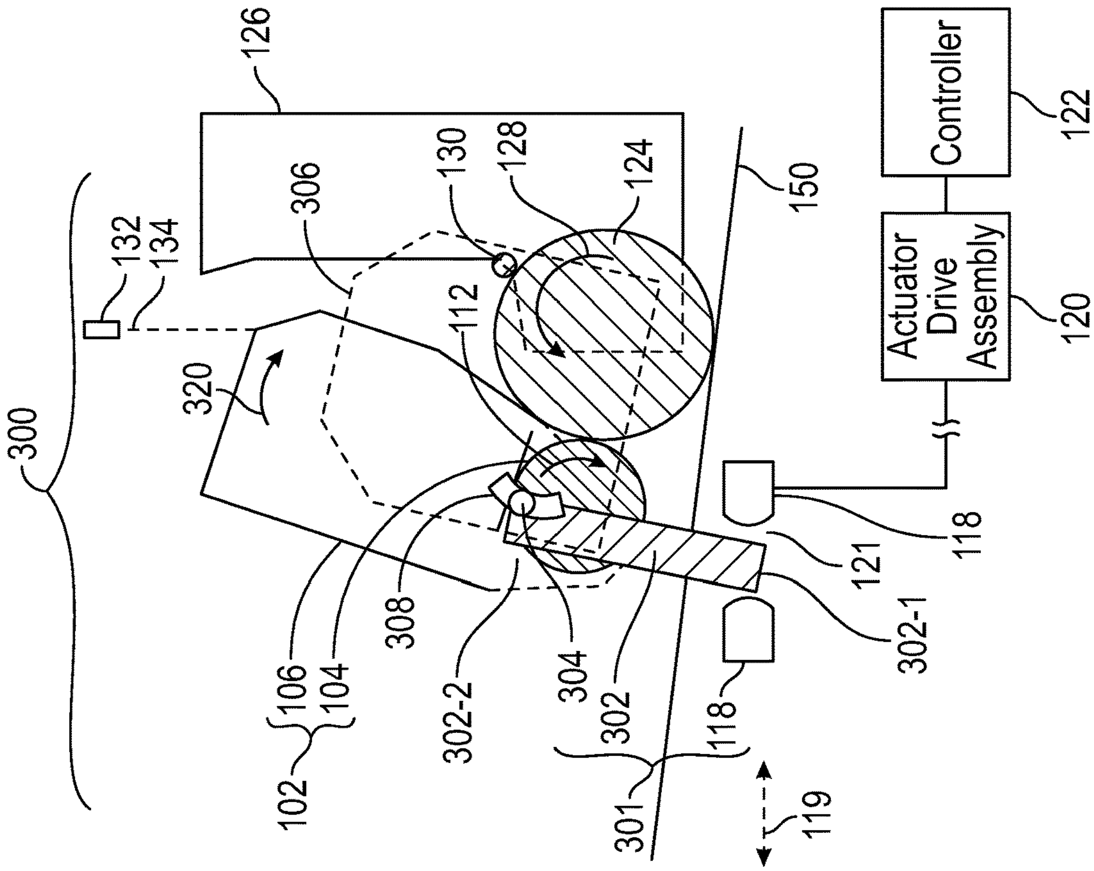
Figure 3A:
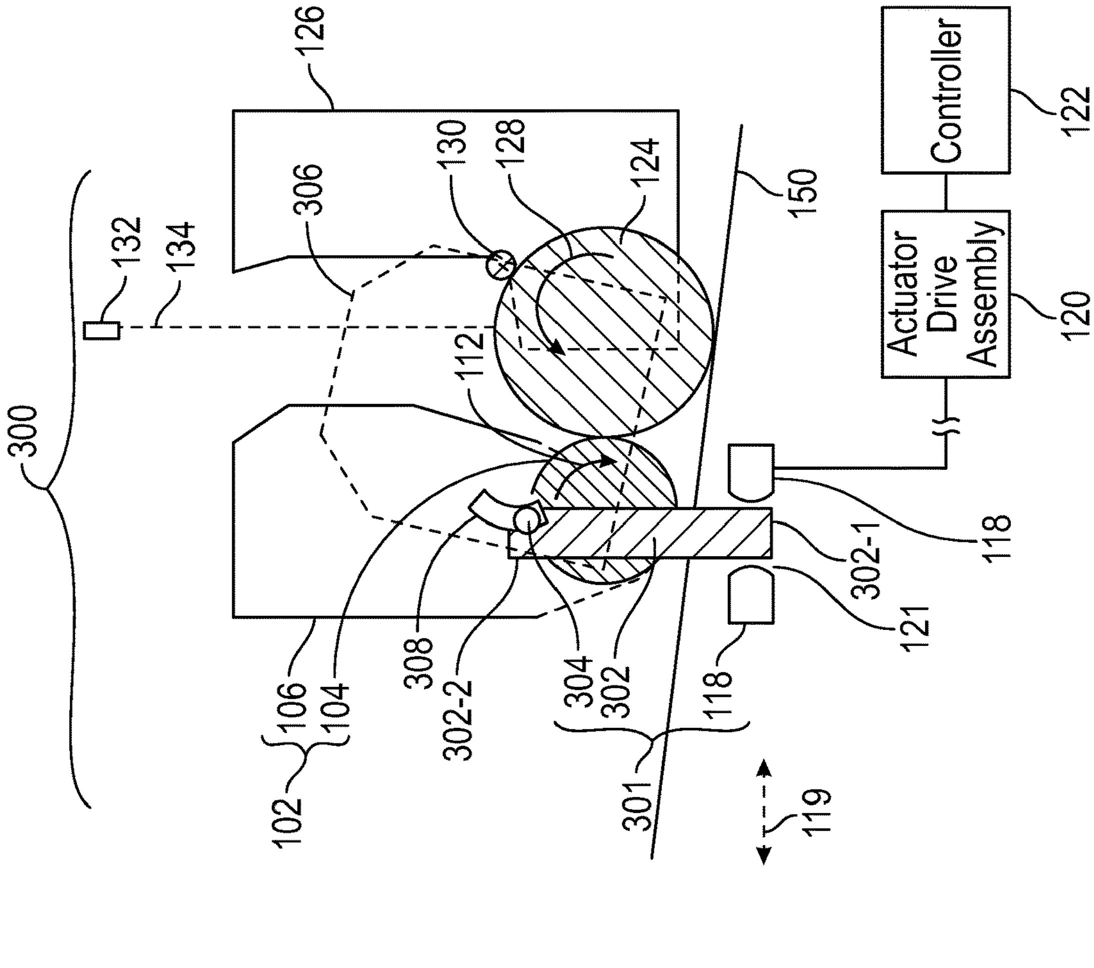

FIGS. 3A-3B show a different arrangement of an image forming device 300 in which the cartridge housing can be moved (e.g., rotated) from the first position shown in FIG. 3A to the second position shown in FIG. 3B.

Components of the image forming device 300 similar to those of the image forming device 100 of FIGS. 1A-1B share the same reference numerals.

In the first position of FIG. 3A, the cartridge housing does not block the light 134 emitted by the light source 132 from reaching the outer surface of the photosensitive drum 124. In the second position shown in FIG. 3B, the cartridge housing has been rotated such that the cartridge housing blocks the light 134 emitted by the light source 132 from reaching the outer surface of the photosensitive drum 124.

The rotation of the cartridge housing according to FIGS. 3A-3B is based on use of an actuator assembly 301 that includes the actuator 118, a lever 302, and a pin 304 that is pivotally attached to the lever 302 at a second end portion 302-2 of the lever 302. A first end portion 302-1 of the lever 302 is received in the receptacle 121 of the actuator 118.

FIGS. 3A-3B also show a motion transfer plate 306 of the image forming device 300. The motion transfer plate 306 is fixedly mounted in the image forming device 300, and is part of the support for the cartridge. The motion transfer plate 306 has a curved groove 308 along which the pin 304 can slide. In the first position of the cartridge housing shown in FIG. 3A, the pin 304 is near the bottom portion of the curved groove 308.

When the actuator 118 is shifted to the left along the axis 119 to the position shown in FIG. 3B, the lever 302 is engaged by the actuator 118, which causes pivoting of the lever 302 relative to the motion transfer plate 306 such that the pin 304 slides upwardly along the curved groove 308 of the motion transfer plate 306.

Since the motion transfer plate 306 is fixed relative to the image processing device 300, the movement of the pin 304 (which is attached to the cartridge housing) causes a corresponding motion that follows the curved profile of the curved groove 308. This causes a rotation of the cartridge housing in a rotational direction 310 (e.g., a clockwise direction), to the position shown in FIG. 3B where the cartridge housing blocks the light 134 emitted by the light source 132 from reaching the outer surface of the photosensitive drum 124.

During an image forming operation of the image forming device 300, if the cartridge housing has been moved to its second position (light blocking position) shown in FIG. 3B, then the outer surface of the photosensitive drum 124 would remain at the uniform electric potential charged by the imaging charging element 130. An electrostatic latent image based on the radiation of the light 134 from the light source 132 would not be produced on the outer surface of the photosensitive drum 124 when the cartridge housing blocks the light 134 from the outer surface of the photosensitive drum 124.

As a result, in the first examples noted above where the toner is to be transferred from the developing roller 104 to the photosensitive drum 124 at locations of the electrostatic latent image, the blocking of the light 134 from the outer surface of the photosensitive drum 124 would disable the toner transfer from the developing roller 104 to the outer surface of the photosensitive drum 124. Because there is no light irradiation of the uniform electric potential formed on the surface of the photosensitive drum 124 by the imaging charging element 130, the outer surface of the photosensitive drum 124 at the uniform electric potential to prevent the transfer of the toner from the developing roller 104 to the photosensitive drum 124.

On the other hand, in the second examples where the toner is transferred to locations outside of the electrostatic latent image formed on the outer surface of the photosensitive drum 124, the blocking of the light 134 from the outer surface of the photosensitive drum 124 by the cartridge housing would cause the toner to be transferred from the developing roller 104 to the entire outer surface of the photosensitive drum 124 capable of receiving the toner from the developing roller 104 in the supply region 125.

More generally, when the light 134 from the light source 132 is not blocked by the cartridge housing when the cartridge housing is in the first position of FIG. 3A, toner transfer from the developing roller 104 to the photosensitive drum 124 can occur in the normal manner according to an electrostatic latent image formed on the outer surface of the photosensitive drum 124 according to image data received by the controller 122. However, when the light 134 from the light source 132 is blocked by the cartridge housing when the cartridge housing is in the second position of FIG. 3B, toner transfer from the developing roller 104 to the photosensitive drum 124 is disrupted (either no toner is transferred or toner is transferred to the entire outer surface of the photosensitive drum 124 capable of receiving the toner from the developing roller 104 in the supply region 125).

Figure 4:
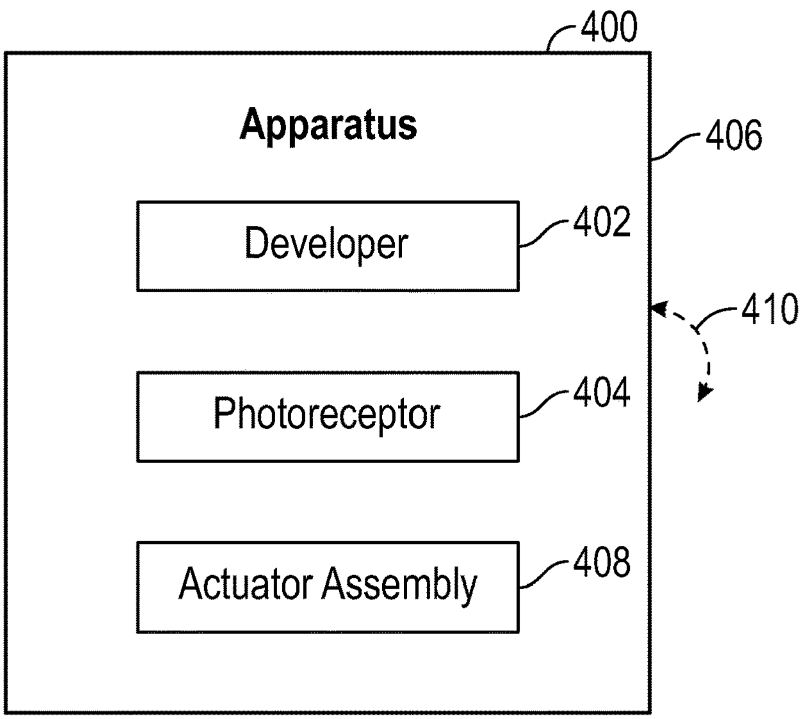
FIG. 4 is a block diagram of an apparatus according to some examples.

FIG. 4 is a block diagram of an apparatus 400 that includes a developer 402 (e.g., the developing roller 104) and a photoreceptor 404 (e.g., the photosensitive drum 124). The developer 402 is to transfer a toner to the photoreceptor 404.

The apparatus 400 further includes a housing 406 that is moveable in an image forming device (e.g., any of 100, 200, 300, etc.). The housing 406 can be a housing of a cartridge.

The apparatus 400 includes an actuator assembly 408 engaged with the housing 406. The actuator assembly 408 is actuatable between different states in response to control by the image forming device during an image forming operation of the image forming device. A first state of the different states corresponds to the housing 406 being at a first position that disrupts a transfer of the toner to a transfer member (e.g., the intermediate transfer member 150 or a target medium) of the image forming device during the image forming operation. A second state of the different states corresponds to the housing 406 being at a second position (moved from the first position at 410) that allows the transfer of the toner to the transfer member.

In some examples, in the first position of the housing 406 the photoreceptor 404 is separated away from the transfer member. In the second position of the housing 406 the photoreceptor 404 is in an engaged position to transfer the toner to the transfer member.

In some examples, the photoreceptor 404 when separated away from the transfer member is spaced apart from the transfer member by a greater distance than when the photoreceptor 404 is in the engaged position.

In some examples, in the first position the housing 406 blocks light from a light source from reaching the photoreceptor 404, where the light is to form an electrostatic latent image on the photoreceptor 404. In the second position the housing 406 allows the light from the light source to reach the photoreceptor 404.

In some examples, the actuator assembly 408 includes a lever (e.g., 142-1 of FIGS. 1A-1B, 202 of FIGS. 2A-2B, 302 of FIGS. 3A-3B) moveable by an actuator drive assembly 120 of the image forming device. The lever when moved causes actuation of the actuator assembly 408 between the different states.

In some examples, the actuator assembly 408 includes a teeth profile (e.g., 144-1 of FIGS. 1A-1B) on the housing 406.

In some examples, the actuator assembly 408 includes one of a groove and a pin slidable along the groove.

Figure 5:
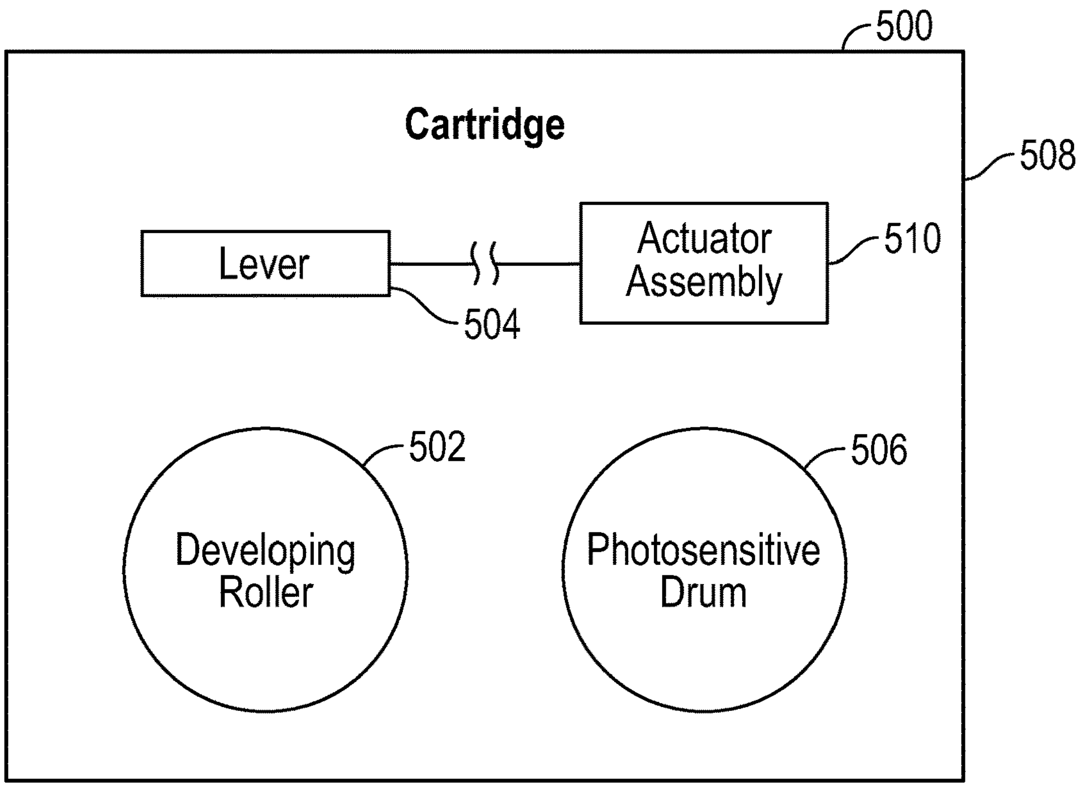
FIG. 5 is a block diagram of a cartridge for an image forming device, according to some examples.

FIG. 5 is a block diagram of a cartridge 500 for an image forming device according to some examples. The cartridge 500 includes a developing roller 502, and a lever 504 moveable between different positions by a mechanism (e.g., the actuator drive assembly 120) of the image forming device during an image forming operation of the image forming device.

The cartridge 500 further includes a photosensitive drum 506, where the developing roller 502 is to transfer a toner to the photosensitive drum 506. The cartridge 500 includes a housing 508 moveable in the image forming device.

The cartridge 500 includes an actuator assembly 510 engaged with the housing 508. The lever 504 when moved actuates the actuator assembly 510 between different states in response to control by the image forming device during the image forming operation. A first state of the different states corresponds to the housing 508 being at a first position that disrupts a transfer of the toner to a transfer member of the image forming device during the image forming operation, and a second state of the different states corresponds to the housing 508 being at a second position that does not disrupt the transfer of the toner to the transfer member.

Figure 6:
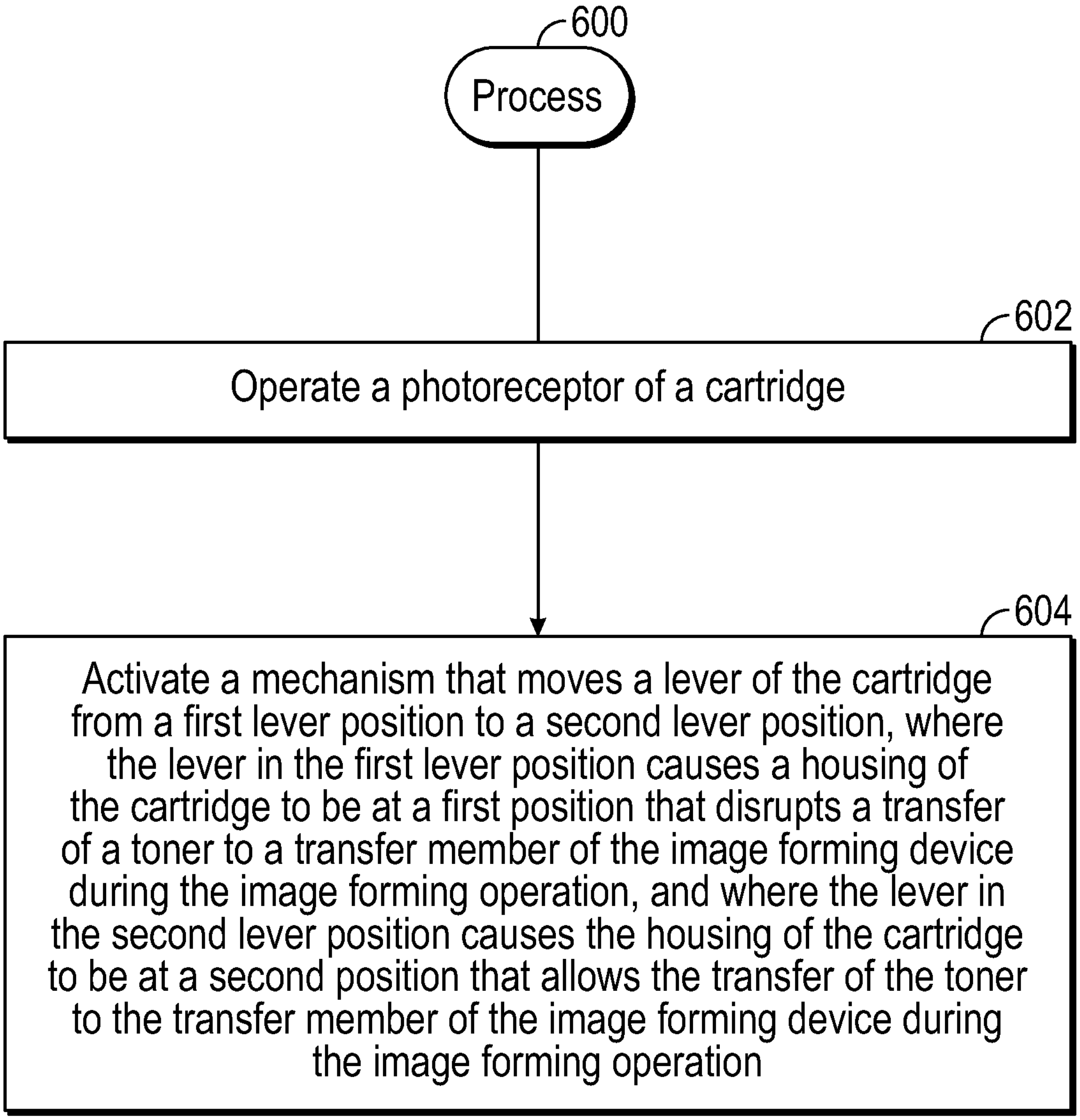
FIG. 6 is a flow diagram of a process according to some examples.

FIG. 6 is a flow diagram of a process 600 according to some examples. During an image forming operation of an image forming device to form an image on a target medium, the process 600 includes tasks 602 and 604.

The process 600 includes operating (at 602) a photoreceptor of a cartridge. The process 600 includes activating (at 604) a mechanism that moves a lever (e.g., 142-1 of FIGS. 1A-1B, 202 of FIGS. 2A-2B, 302 of FIGS. 3A-3B) of the cartridge from a first lever position to a second lever position, where the lever in the first lever position causes a housing of the cartridge to be at a first position that disrupts a transfer of a toner to a transfer member of the image forming device during the image forming operation, and where the lever in the second lever position causes the housing of the cartridge to be at a second position that allows the transfer of the toner to the transfer member of the image forming device during the image forming operation.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. An apparatus comprising:

a developing roller;

a photoreceptor, the developing roller to transfer a toner to the photoreceptor;

a housing that is moveable in an image forming device; and an lever and gear assembly engaged with the housing, wherein the lever and gear assembly is actuatable between different states in response to control by the image forming device during a continuous print operation of the image forming device to selectively disrupt toner transfer, wherein a first state of the different states corresponds to the housing being at a first position that disrupts a transfer of the toner to a intermediate transfer belt of the image forming device during the continuous print operation, and a second state of the different states corresponds to the housing being at a second position that allows the transfer of the toner to the intermediate transfer belt.

2. The apparatus of claim 1, wherein in the first position of the housing the photoreceptor is separated away from the intermediate transfer belt.

3. The apparatus of claim 2, wherein in the second position of the housing the photoreceptor is in an engaged position to transfer the toner to the intermediate transfer belt.

4. The apparatus of claim 3, wherein the photoreceptor when separated away from the intermediate transfer belt is spaced apart from the intermediate transfer belt by a greater distance than when the photoreceptor is in the engaged position.

5. The apparatus of claim 1, wherein in the first position the housing blocks light from a light source from reaching the photoreceptor, and wherein the light is to form an electrostatic latent image on the photoreceptor.

6. The apparatus of claim 5, wherein in the second position the housing allows the light from the light source to reach the photoreceptor.

7. The apparatus of claim 1, wherein the lever and gear assembly comprises:

a lever moveable by an motor of the image forming device, the lever when moved causing actuation of the lever and gear assembly between the different states.

8. The apparatus of claim 1, wherein the lever and gear assembly comprises a teeth profile on the housing.

9. The apparatus of claim 1, wherein the lever and gear assembly comprises one of a groove and a slidable pin.

10. The apparatus of claim 1, wherein the developer and the photoreceptor are mounted to the housing.

11. The apparatus of claim 1, wherein the toner is in the housing that is associated with the print operation.

12. A cartridge for an image forming device, comprising:

a developing roller;

a lever moveable between different positions during a continuous print operation of the image forming device to selectively disrupt toner transfer;

a photosensitive drum, the developing roller to transfer a toner to the photosensitive drum;

a housing moveable in the image forming device; and an lever and gear assembly engaged with the housing, wherein the lever is to actuate the lever and gear assembly between different states in response to control by the image forming device during the continuous print operation, wherein a first state of the different states corresponds to the housing being at a first position that disrupts a transfer of the toner to a intermediate transfer belt of the image forming device during the continuous print operation, and a second state of the different states corresponds to the housing being at a second position that does not disrupt the transfer of the toner to the intermediate transfer belt.

13. The cartridge of claim 12, wherein in the first position of the housing the photosensitive drum is separated away from the intermediate transfer belt so that transfer of the toner from the photosensitive drum to the intermediate transfer belt is disabled.

14. The cartridge of claim 12, wherein in the first position the housing blocks light from a light source from reaching the photosensitive drum, and wherein the light is to form an electrostatic latent image on the photosensitive drum.

15. A method comprising:

during a continuous print operation of an image forming device to form an image on a target medium to selectively disrupt toner transfer:

operating a photoreceptor of a cartridge; and selectively moving a lever of the cartridge from a first lever position to a second lever position, wherein the lever in the first lever position causes a housing of the cartridge to be at a first position that disrupts a transfer of a toner to a intermediate transfer belt of the image forming device during the continuous print operation, and wherein the lever in the second lever position causes the housing of the cartridge to be at a second position that allows the transfer of the toner to the intermediate transfer belt of the image forming device during the continuous print operation.

16. The method of claim 15, wherein:

in the first position of the housing the photoreceptor is separated away from the intermediate transfer belt so that transfer of the toner from the photoreceptor to the intermediate transfer belt is disabled, or wherein in the first position the housing blocks light from a light source from reaching the photoreceptor, and wherein the light is to form an electrostatic latent image on the photoreceptor.

* * * * *